United States Patent [19]

Olander

[11] 4,083,828

[45] Apr. 11, 1978

[54] PREPARATION OF POLYPHENYLENE OXIDES BY THE OXIDATIVE COUPLING OF A PHENOLIC MONOMER IN THE PRESENCE OF A MANGANESE SALT, BASE AND A SECONDARY AMINE

[75] Inventor: Walter Karl Olander, Clifton Park, N.Y.

[73] Assignee: General Electric Company, Pittsfield, Mass.

[21] Appl. No.: 753,508

[22] Filed: Dec. 21, 1976

[51] Int. Cl.$^2$ ............................................. C08G 65/44
[52] U.S. Cl. ................................................. 260/47 ET
[58] Field of Search .................................... 260/47 ET

[56] References Cited

U.S. PATENT DOCUMENTS

| | | | |
|---|---|---|---|
| 3,377,501 | 8/1967 | Bussink et al. | 260/47 ET |
| 3,787,361 | 1/1974 | Nakashio et al. | 260/47 ET |
| 3,962,181 | 6/1976 | Sakauchi et al. | 260/47 ET |

*Primary Examiner*—Lester L. Lee
*Attorney, Agent, or Firm*—Morgan, Finnegan, Pine, Foley & Lee

[57] ABSTRACT

A novel process is described for the preparation of polyphenylene oxides by the oxidative coupling of phenolic monomers which is based on the use of a catalyst which comprises a manganese salt, base and a secondary amine.

13 Claims, No Drawings

PREPARATION OF POLYPHENYLENE OXIDES BY THE OXIDATIVE COUPLING OF A PHENOLIC MONOMER IN THE PRESENCE OF A MANGANESE SALT, BASE AND A SECONDARY AMINE

This invention provides a new and novel process for the preparation of polyphenylene oxides which is based on the oxidative coupling of phenolic monomers in the presence of a catalyst which comprises a manganese salt, base and a secondary amine.

BACKGROUND OF INVENTION

The polyphenylene oxides and methods for their preparation are known in the art and are described in numerous publications, including Hay, U.S. Pat. Nos. 3,306,874 and 3,306,875. The Hay processes are based on the use of copper-amine complexes as catalysts for the oxidative coupling of phenolic monomers. Manganese catalyzed methods for the preparation of polyphenylene oxides are disclosed in McNelis, U.S. Pat. Nos. 3,220,979; Olander, 3,956,242; Nakashio, 3,573,257; and Nakashio, 3,787,361. Cizek, U.S. Pat. No. 3,383,435, discloses compositions of polyphenylene oxides and styrene resins which are useful thermoplastic molding compositions.

In the applicant's copending applications Ser. No. 491,370, filed July 24, 1974 and Ser. No. 534,903 filed Dec. 20, 1974, there are disclosed novel procedures for polymerizing polyphenylene oxides with complex manganese based catalysts. All of these patents and applications are hereby incorporated by reference.

The processes which have used manganese based catalysts have employed both chelated manganese and manganese salts without any chelate forming compound. In U.S. Pat. No. 3,573,257, a process is disclosed that is characterized by the use of a managnese salt with an alkali alcoholate in the absence of an amine. This patent denigrates the use of amines and actually states that amines should now be used since amines tend to cause deterioration of the properties of the polymer.

It has been discovered that the process disclosed in U.S. Pat. No. 3,573,257 can be improved if a secondary amine is employed in conjunction with a manganese salt and a basic reaction media. The improvements that result from the use of a secondary amine in conjunction with a manganese salt for the oxidative coupling of phenolic monomers, include a more controlled process that permits the selection of a termination point and which yields a polymer having improved properties as compared to a polymer made in the absence of a secondary amine.

Accordingly, it is a primary object of this invention to provide an improved process for the production of polyphenylene oxides by means of a catalyst which comprises a manganese salt and a secondary amine.

It is a further object of this invention to provide a process for the preparation of a polyphenylene oxide with a manganese salt that provides a polyphenylene oxide having improved properties as compared to a polyphenylene oxide that is prepared with other manganese catalyst systems.

DETAILED DESCRIPTION OF THE INVENTION

The invention provides an improved method for the preparation of a polyphenylene oxide by the oxidative coupling of a phenolic monomer with oxygen under polymer forming conditions in the presence of a catalyst which consists essentially of a manganese compound and a basic media. The improvement in the process comprises adding to the reaction mixture a secondary amine of the formula:

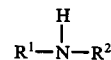

wherein $R^1$ and $R^2$ are independently selected from the group consisting of lower alkyl of from 1 to 8 carbon atoms aryl (lower) alkyl or $R^1$ and $R^2$ may be concatenated together with a

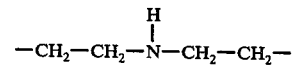

group to form a piperazine ring.

As used herein and in the appended claims, the term lower alkyl of from 1 to 8 carbon atoms include both straight and branched chain groups such as methyl, ethyl, i-propyl, n-propyl, n-butyl, n-pentyl, n-hexyl and the like. The term aryl (lower) alkyl is employed to include groups having 1-8 carbon atoms such as methyl, ethyl, i-propyl, n-propyl, n-butyl, n-pentyl, n-hexyl and the like that are attached to a phenyl group. These groups include benzyl and phenethyl.

Generally the amount of secondary amine that is employed in the process may be determined by an evaluation of molding compositions that include the polyphenylene oxide polymer. The use of a secondary amine will result in a polymer composition that has improved physical properties as determined by standard test methods, e.g. Izod impact strength. The amounts of secondary amine will usually fall between 0.05 and 10 parts by weight and more preferably 0.1 and 5 parts by weight of secondary amine per 100 parts by weight of phenolic monomer.

Suitable secondary amines include those secondary amines that do not inhibit the polymerization reaction or impart negative or deleterious properties to a composition of the product of the polymerization with a styrene resin. Specific examples include di-methyl amine, methylethyl amine, di-ethylamine, di-n-propyl amine, di-n-butylamine, di-n-hexylamine, piperazine and the like.

It has been noted that the point in the polymerization at which the secondary amine is added can materially affect the process and it is generally preferred to add the secondary amine prior to initiation of the polymerization reaction.

The phenolic monomers are preferably of the formula:

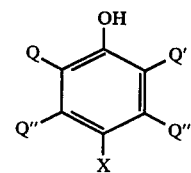

wherein X is a substituent selected from the group consisting of hydrogen, chlorine, bromine and iodine; Q is a monovalent substituent selected from the group consisting of hydrocarbon radicals, halohydrocarbon radicals having at least two carbon atoms between the halogen atom and the phenol nucleus, hydrocarbonoxy radicals and halohydrocarbonoxy radicals having at least two carbon atoms between the halogen atom and the phenol nucleus; and Q' is a defined for Q and in addition may be halogen and Q" are each as defined for Q' and in addition for Q' and in addition may be hydrogen, with the proviso that Q, Q' and Q" are all free of tertiary carbon atom.

The preferred phenolic monomer is 2,6-xylenol.

The process may be carried out by dissolving the phenolic monomer in an appropriate reaction solvent such as toluene and adding to a portion of this a manganese (II) salt and the secondary amine.

The useful manganese salts include manganese (II) salts such as halides i.e. manganese (II) chloride (also known as manganese chloride), manganese (II) bromide, manganese (II) iodide, etc., as well as other manganese (II) compounds such as manganese (II) carbonate, manganese (II) oxalate, manganese (II) sulfate, manganese (II) acetate, manganese (II) nitrate, manganese (II) phosphates, etc., including hydrated forms of such manganese (II) compounds. In addition other manganese salts such as manganese (VII) salts, i.e. potassium permanganate may be employed. While specific reference is made hereafter to various manganese (II) salts it is to be understood that the invention is not limited to manganese (II) salts.

Usually the amount of manganese ion will range from 0.1 to 1 part by weight per 100 parts of phenolic monomer are employed in the process.

A temperature of from about 40° to about 120° F, preferably from about 70° to about 90° F may be maintained during the polymerization. Atomspheric pressure or superatmospheric pressures may be employed if desired.

The manganese (II) salt is preferably separately added as a solution in a lower alkanol. A strongly basic reaction medium is required and this may be provided by the addition of a strong alkali metal base, e.g. alkali metal hydroxides, alkali metal alkoxides, etc. or mixtures thereof. Commercially available alkali metal bases, such as sodium hydroxide, potassium hydroxide, lithium hydroxide, sodium methoxide, etc. Anhydrous sodium hydroxide pellets may be combined with a lower alkanol and the resulting solution may be added to the reaction mixture. In the alternative aqueous solutions of alkali e.g. 50% sodium hydroxide may be employed. The amounts of alkali metal base may be readily ascertained by those skilled in the art with a minimum amount of experimentation. In general, suitable phenol: alkali metal base mole ratios are within the range of 1:1 to 100:1, preferably from about 40:1 to about 5:1, and even more preferably from about 20:1 to about 10:1. In the preparation of poly(2,6-dimethyl-1,4-phenylene oxide from 2,6-xylenol it is usually preferred to employ a mole ratio of from about 14:1 to about 18:1 or more preferably about 16:1.

It has been noted that the use of a lower alkanol of from 1 to 8 carbon atoms, e.g. methanol increases the rate of reaction and improves the color of the final product. Generally the increased reaction rate and improved color in the final product are related to the amount of the lower alkanol that is employed in process. Generally, one should not employ that quantity of a lower alkanol which will cause the polyphenylene oxide ro precipitate from solution. The useful amounts of a lower alkanol will range from about 1 to about 40% by weight or more preferably from about 10 to about 25% by weight of the total weight of liquid reaction system (reaction solvent and lower alkanol).

The reaction is initiated by causing oxygen to flow into the reactor at a rate which is in excess of the amount of oxygen that is absorbed in the oxidative coupling reaction. Agitation is maintained during the polymerization reaction and when the polymer reaches an intrinsic viscosity of above about 0.45 dl/g as measured in chloroform at 30° C, the polymerization may be terminated by the addition of an aqueous acid such as a 50% aqueous acetic or sulfuric acid solution. Thereafter, the polymer may be separated with a lower alkanol antisolvent such as methanol and recovered from the polymerization mixture in accordance with standard techniques.

DESCRIPTION OF THE PREFERRED EMBODIMENTS

The following examples illustrate the process of the invention. They are merely illustrative and are not to be construed to limit the invention in any manner whatsoever.

EXAMPLE 1

The following materials were employed to prepare poly (2,6-dimethyl, 1,4-phenylene oxide):

| | |
|---|---|
| toluene | 1950 g |
| methanol | 450 g |
| 2,6-xylenol | 600 g |
| sodium hydroxide | 12.0 g (pellets) |
| MnCl$_2$ | 3.7 g (0.0294 mole) |

In a 1 gallon stirred reactor (Chemco) the 2,6-xylenol, as a 52.3 weight percent stock solution in toluene, the remaining toluene and amine are combined. The sodium hydroxide and manganese chloride are dissolved separately in sufficient methanol for complete solution. Oxygen flow to the reactor is set at 3.0 SCFH and the temperature adjusted to 80° F. Agitation is set at 1000 RPM. The manganese (II) chloride and base are added in that order and the remaining methanol is added as a wash solution. The reaction temperature is controlled at 90° F. thereafter. The reactions are terminated as indicated in Table I by adding 50% aqueous acetic acid and methanol precipitation. The polymers were dried at 80° C in vacuo until they were substantially completely free of solvent.

TABLE I

| | amine | wt.% of 2,6-xylenol | I.V./time$^a$ |
|---|---|---|---|
| A | di-n-butylamine | 1.5 | 0.51/105 |
| B | di-n-butylamine | 1.0 | 0.43/80 |
| C | piperazine | 0.5 | 0.56/90 |
| D | control | — | 0.80/100 |
| E | control | — | 0.72/80 |

It was noted that the controls D and E exhibit sharp build curves with no sign of leveling off in contrast with runs A and B wherein the polymerization reaction is substantially self-limiting when the polymer reaches an I. V. of about 0.5 dl/g.

Each of the poly (2,6-dimethyl-1,4-phenylene oxide) polymers was combined with the following materials and the resulting composition was molded into test bars;

|  | (parts by weight) |
| --- | --- |
| poly (2,6-dimethyl-1,4-phenylene oxide) | 50.0 |
| high impact, rubber modified styrene | 50.0 |
| triphenylphosphate | 3.0 |
| tridecylphosphite | 1.0 |
| polyethylene | 1.5 |
| zinc sulfide | 0.15 |
| zinc oxide | 0.15 |
| titanium dioxide | 3.0 |

The molded test bars were found to have the following physical properties.

a. Intrinsic viscosity as measured in chloroform at 30° C and expressed in dl/g after the stated number of minutes of polymerization.

| | Izod Impact ft.lbs/in. | Gardner Impact ft.lbs | Elongation % | Tensile Yield psi | Tensile Strength psi |
| --- | --- | --- | --- | --- | --- |
| A | 3.77 | 330 | 83.4 | 9440 | 8800 |
| B | 1.92 | 290 | 53.4 | 9000 | 8100 |
| C | 3.01 | 270 | 59.7 | 9140 | 8180 |
| D | 1.0 | 50 | 26.5 | 9800 | 8400 |
| E | 1.1 | 130 | 27.7 | 9600 | 8300 |

EXAMPLE 2

The polymers of Table II were prepared according to the general procedure of Example 1. The reaction composition was based on 3000 g. in all cases with a molar catalyst ratio of 2,6-xylenol to Mn of 167 to 1 and a 2,6-xylenol to OH ratio of 16.1:1.

| | Composition (wt %) | | | | Temp °F | IV/time | | | |
| --- | --- | --- | --- | --- | --- | --- | --- | --- | --- |
| | 2,6-xylenol | methanol | toluene | di-n-butylamine | | 60 | 80 | 100 | 120 |
| F | 20 | 15 | 65 | 1.0 (6.0g) | 90 | — | 0.42 | 0.48 | 0.50 |
| G | 20 | 15 | 65 | 1.5 (9.0g) | 90 | — | 0.43 | 0.47 | 0.50 |
| H | 20 | 15 | 65 | 2.0 (12.0g) | 90 | — | 0.47 | 0.53 | 0.52 |
| I | 20 | 15 | 65 | 1.5 (9.0g) | 90 | — | — | 0.50 | 0.51 |
| J | 20 | 15 | 65 | 1.5 (9.0g) | 100 | 0.34 | 0.42 | 0.42 | 0.42 |
| K | 20 | 15 | 65 | 1.5 (9.0g) | 110 | 0.33 | 0.34 | 0.43 | 0.45 |
| L | 20 | 20 | 60 | 1.5 (9.0g) | 90 | 0.39 | 0.47 | 0.51 | 0.53 |
| M | 20 | 20 | 60 | 1.5 (9.0g) | 90 | 0.36 | 0.48 | 0.51 | 0.54 |
| N | 20 | 25 | 55 | 1.5 (9.0g) | 90 | 0.45 | 0.51 | 0.53 | 0.54 |

Although the above examples have shown various modifications of the present invention, other variations are possible in light of the above teachings. It is, therefore, to be understood that changes may be made in the particular embodiments of the invention described which are within the full intended scope of the invention as defined by the appended claims.

I claim:

1. In a method for the preparation of a polyphenylene oxide by the oxidative coupling of a phenolic monomer with oxygen under polymer forming conditions in the presence of a catalyst which consists essentially of a manganese salt and a basic media, the improvement which comprises adding to the reaction mixture a secondary amine of the formula:

$$R^1-\underset{\underset{H}{|}}{N}-R^2$$

wherein $R^1$ and $R^2$ are independently selected from the group consisting of lower alkyl of from 1 to 8 carbon atoms, aryl (lower) alkyl or $R^1$ and $R^2$ may be concentrated together to form a piperazine ring.

2. The method of claim 1 wherein the phenolic monomer is selected from compounds of the formula:

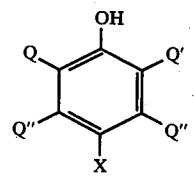

wherein X is a substituent selected from the group consisting of hydrogen, chlorine, bromine and iodine; Q is a monovalent substituent selected from the group consisting of hydrocarbon radicals, halohydrocarbon radicals having at least two carbon atoms between the halogen atom and the phenol nucleus hydrocarbonoxy radicals and halohydrocarbonoxy radicals having at least two carbon atoms between the halogen atom and the phenol nucleus; and Q' is as defined for Q and in addition may be halogen and Q" and each as defined for Q' and in addition may be hydrogen, with the proviso that Q, Q' and Q" are all free of a tertiary carbon atom.

3. The method of claim 2 wherein the reaction is carried out in a basic media which includes a lower alkanol.

4. The method of claim 3 wherein the phenolic monomer is 2,6-xylenol.

5. The method of claim 1 wherein from 0.05 to 10 parts by weight of secondary amine is employed per 100 parts by weight of phenolic monomer.

6. A method for the preparation of a polyphenylene oxide which comprises oxidatively coupling a phenolic monomer in the presence of oxygen, a basic medium a lower alkanol of from 1 to 8 carbon atoms, a manganese (II) salt and a secondary amine of the formula:

$$R^1-\underset{\underset{H}{|}}{N}-R^2$$

wherein $R^1$ and $R^2$ are independently selected from the group consisting of lower alkyl of from 1 to 8 carbon atoms, aryl (lower) alkyl, or $R^1$ and $R^2$ may be concentrated together to form a piperazine ring.

7. The method of claim 6 wherein the phenolic monomer is of the formula:

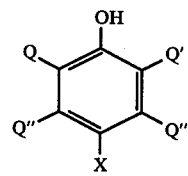

wherein X is a substituent selected from the group consisting of hydrogen, chlorine, bromine and iodine; Q is a monovalent substituent selected from the group consisting of hydrocarbon radicals, halohydrocarbon radicals having at least two carbon atoms between the halogen and the phenol nucleus, hydrocarbonoxy radicals and halohydrocarboxy radicals having at least two carbon atoms between the halogen atom and the phenol nucleus; and Q' is as defined for Q and in addition may be halogen and Q'' are each as defined for Q' and in addition may be hydrogen, with the proviso that Q, Q' and Q'' are all free of a tertiary carbon atom.

8. The method of claim 7 wherein the phenolic monomer is 2,6-xylenol.

9. The method of claim 8 wherein the lower alkanol is methanol.

10. The method of claim 9 wherein the secondary amine is di-n-butylamine.

11. The method of claim 6 wherein from 0.1 to 5 parts by weight of secondary amine is employed per 100 parts by weight of phenolic monomer.

12. The method of claim 11 wherein from 0.1 to 1 part by weight of manganese per 100 parts by weight of phenolic monomer are employed in the process.

13. The method of claim 12 wherein the total of the liquid reaction system includes from 1 to 40% by weight of methanol.

* * * * *